United States Patent
Katiyar

(10) Patent No.: US 11,340,935 B2
(45) Date of Patent: May 24, 2022

(54) METHODS AND SYSTEMS FOR CONVERTING A RELATED GROUP OF PHYSICAL MACHINES TO VIRTUAL MACHINES

(71) Applicant: VMware, Inc., Palo Alto, CA (US)

(72) Inventor: Abhinav Katiyar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/061,061

(22) Filed: Oct. 1, 2020

(65) Prior Publication Data
US 2021/0200569 A1 Jul. 1, 2021

Related U.S. Application Data

(63) Continuation of application No. 15/972,211, filed on May 6, 2018, now Pat. No. 10,795,712, which is a continuation of application No. 15/095,676, filed on Apr. 11, 2016, now Pat. No. 9,965,314, which is a continuation of application No. 14/050,317, filed on Oct. 19, 2013, now Pat. No. 9,311,129, which is a continuation of application No. 12/256,198, filed on Oct. 22, 2008, now Pat. No. 8,572,608.

(51) Int. Cl.
*G06F 9/455* (2018.01)
*G06F 8/20* (2018.01)

(52) U.S. Cl.
CPC .......... *G06F 9/45558* (2013.01); *G06F 8/20* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,256,635 B1 * | 7/2001 | Arrouye | G06F 9/44505 |
| 6,351,777 B1 * | 2/2002 | Simonoff | H04L 29/06 |
| | | | 709/249 |
| 6,434,594 B1 * | 8/2002 | Wesemann | G06F 9/5055 |
| | | | 709/201 |
| 7,350,194 B1 * | 3/2008 | Alpern | G06F 11/362 |
| | | | 714/E11.207 |
| 7,367,017 B2 * | 4/2008 | Maddocks | G06F 9/451 |
| | | | 717/115 |

(Continued)

*Primary Examiner* — Eric Coleman

(57) ABSTRACT

A method for processing virtualization of computers that are part of a group into virtual computers is provided. The method includes obtaining relationship data from the computers, where the relationship data identifies parameters used to communicate within the group. Then, the method analyzes utilization parameters for each of the computers of the group. A visual model for proposed virtualization of the group of computers is then generated. The visual model identifies hosting machines designated to define a virtual computer for each of the computers, where the visual model provides a graphical illustration of the group of computers once converted to virtual computers. The method enables adjustment of the proposed virtualization of the group of computers. Then, an execution sequence of virtualization operations to be carried out is generated, if execution of the proposed virtualization is triggered, and the execution sequence is saved to storage and accessed upon execution.

20 Claims, 5 Drawing Sheets

(56) References Cited

U.S. PATENT DOCUMENTS

| | | | | |
|---|---|---|---|---|
| 7,535,856 | B2* | 5/2009 | Booth, III | H04L 12/4641 |
| | | | | 370/255 |
| 7,810,092 | B1* | 10/2010 | van Rietschote | G06F 9/45558 |
| | | | | 718/1 |
| 7,912,955 | B1* | 3/2011 | Machiraju | G06F 9/5077 |
| | | | | 709/226 |
| 8,336,046 | B2* | 12/2012 | Bowman | G06F 9/5061 |
| | | | | 718/1 |
| 8,364,639 | B1* | 1/2013 | Koryakina | G06F 9/45558 |
| | | | | 707/639 |
| 8,554,890 | B2* | 10/2013 | Tameshige | G06F 8/63 |
| | | | | 709/223 |
| 8,572,608 | B2* | 10/2013 | Katiyar | G06F 8/20 |
| | | | | 718/1 |
| 2002/0065926 | A1* | 5/2002 | Hackney | G06F 16/951 |
| | | | | 709/231 |
| 2002/0138443 | A1* | 9/2002 | Schran | H04L 43/50 |
| | | | | 705/64 |
| 2003/0233385 | A1* | 12/2003 | Srinivasa | H04L 67/42 |
| | | | | 718/1 |
| 2005/0138601 | A1* | 6/2005 | Simonoff | G06F 8/34 |
| | | | | 717/105 |
| 2006/0161911 | A1* | 7/2006 | Barrs | G06F 11/1484 |
| | | | | 717/170 |
| 2006/0221355 | A1* | 10/2006 | Inui | H04N 1/00474 |
| | | | | 358/1.1 |
| 2006/0294516 | A1* | 12/2006 | Winner | G06F 9/455 |
| | | | | 718/1 |
| 2008/0201414 | A1* | 8/2008 | Amir Husain | G06F 9/5077 |
| | | | | 709/203 |

* cited by examiner

METHODS AND SYSTEMS FOR CONVERTING A RELATED GROUP OF PHYSICAL MACHINES TO VIRTUAL MACHINES

CROSS-REFERENCE TO RELATED APPLICATIONS

This application is a continuation of U.S. patent application Ser. No. 15/972,211, filed May 6, 2018, now U.S. Pat. No. 10,795,712, issued on Nov. 6, 2020, which is a continuation of U.S. patent application Ser. No. 15/095,676, filed Apr. 11, 2016, now U.S. Pat. No. 9,965,314, issued on May 8, 2018, which is a continuation of U.S. patent application Ser. No. 14/050,317, filed Oct. 9, 2013, now U.S. Pat. No. 9,311,129, issued Apr. 12, 2016, which is a continuation of U.S. patent application Ser. No. 12/256,198, filed Oct. 22, 2008, now U.S. Pat. No. 8,572,608, issued Oct. 29, 2013, each of which is incorporated by reference herein.

BACKGROUND

The computing industry has seen many advances in recent years, and such advances have produced a multitude of products and services. Computing systems have also seen many changes, including their virtualization. Virtualization of computer resources generally connotes the abstraction of computer hardware, which essentially separates operating systems and applications from direct correlation to specific hardware. Hardware is therefore abstracted to enable multiple operating systems and applications to access parts of the hardware, defining a seamless virtual machine. The result of virtualization is that hardware is more efficiently utilized and leveraged.

The advent of virtualization has sparked a number of technologies, which allow companies to optimize the utilization of their systems. As a company's enterprise systems are usually installed at various geographic locations, networking protocols are used to interconnect the various systems, which can then be virtualized into one or more virtual servers.

With the recent proliferation of virtual systems and servers, proper deployment practices have become increasingly important. Although vitalizing individual systems has become increasingly simplified with the use of special software programs and tools, this simplification has introduced laborious complexities set-up and configuration of grouped computer systems, enterprise systems, and the like. These complexities arise primarily based on the need to keep system interrelationships intact after virtualization of tens, hundreds or thousands of computers. As managed group systems depend on the processes and/or data produced or generated by other systems of the group, conventional virtualization schemes that virtualize one computer system at a time tends to be time consuming, and prone to errors. Although it is envisioned that care can be taken to account for the interrelationships between the managed systems of a group, these relationships sometimes are dependent on multiple conditions. Unfortunately, the conventional manner of virtualization currently requires virtualization of one computer at a time.

In view of the foregoing, there is a need for methods, systems and computer implemented processes that enable automated virtualization processes for groups of computers, while ensuring that existing interrelationships are maintained or updated.

SUMMARY

In one embodiment, a computer implemented method for processing virtualization of computers that are part of a group into virtual computers is provided. The method includes obtaining relationship data from the computers, where the relationship data identifies parameters used to communicate within the group. Then, the method analyzes utilization parameters for each of the computers of the group. A visual model for proposed virtualization of the group of computers is then generated. The visual model identifies hosting machines designated to define a virtual computer for each of the computers, where the visual model provides a graphical illustration of the group of computers once converted to virtual computers. The method enables adjustment of the proposed virtualization of the group of computers. Then, an execution sequence of virtualization operations to be carried out is generated, if execution of the proposed virtualization plan is triggered, and the execution sequence is saved to storage and accessed upon execution.

In another embodiment, a computer implemented method for visualizing a model of a virtualized data center is provided. The data center has a group of computers designated for virtualization. The method includes obtaining relationship data from the computers, where the relationship data defines parameters used to enable communication among the group of computers of the data center. The method then builds a visual model for display on a screen, where the visual model is for a proposed virtualization of the group of computers of the data center. The visual model identifies hosting machines designated to host a virtual computer for a particular one of the computers. The visual model is graphically interactive to enable modification of the proposed virtualization. The method further generates an execution sequence of virtualization operations to be carried out if execution of the proposed virtualization is triggered, where the execution sequence is saved to memory and accessed upon execution.

BRIEF DESCRIPTION OF THE DRAWINGS

The invention may best be understood by reference to the following description taken in conjunction with the accompanying drawings.

DETAILED DESCRIPTION

Figure 1:
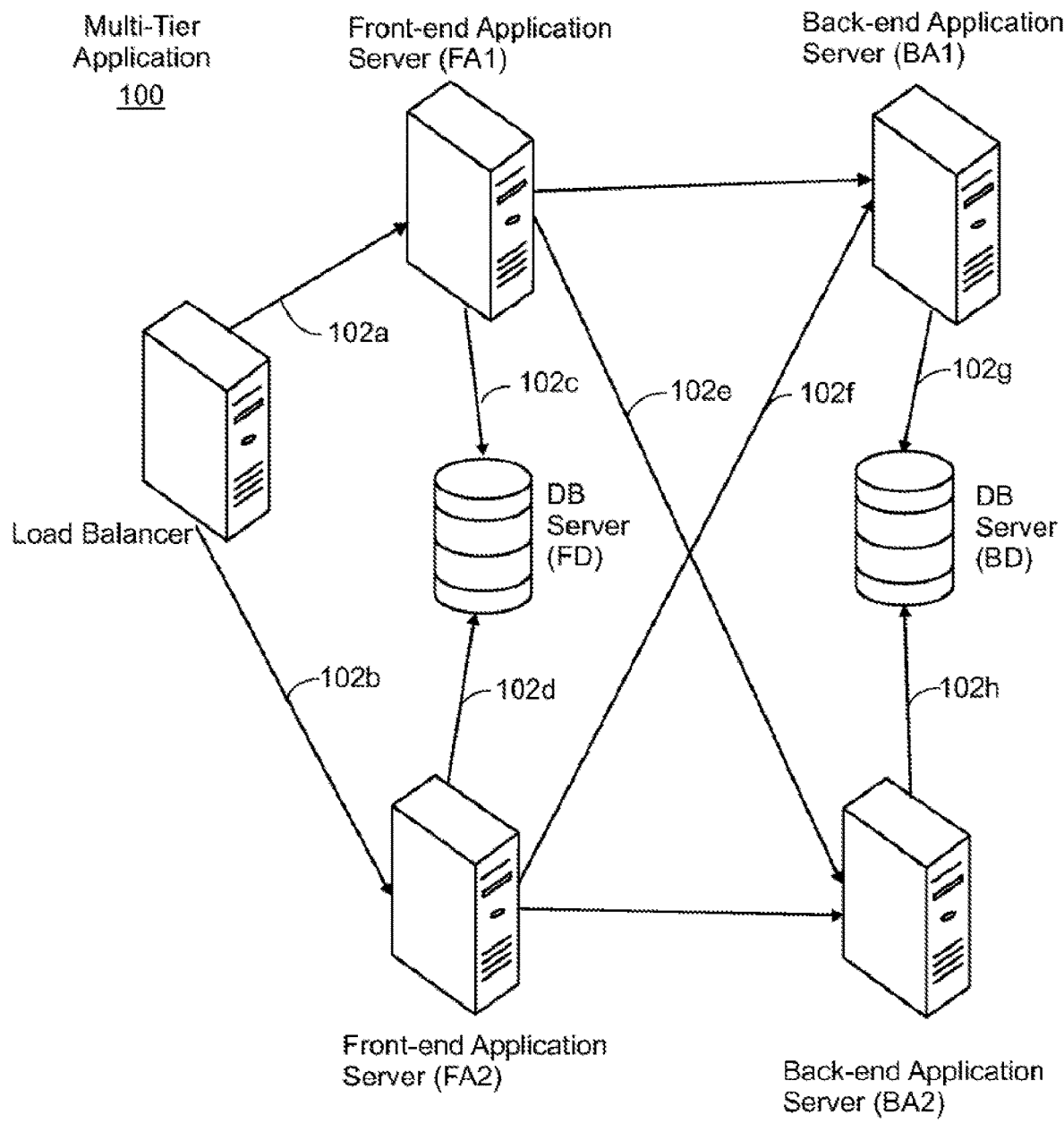
FIG. 1 illustrates the physical machines of a multi-tiered application, in accordance with one embodiment of the present invention.

FIG. 1 illustrates a diagram of a physical configuration of computer systems for a multi-tiered application 100. The multi-tiered application 100 uses a plurality of machines to enable execution of the tasks required for a given service(s). The services may be for an enterprise, which may have many applications and systems. The systems may include email systems, human resources systems, accounting systems, engineering systems, sales, etc. Thus, multi-tiered application 100 can represent either simple or very complete systems.

In this example, each of the computer systems are part of a physical computer system environment, where actual computers or servers are processing instructions and acting in cooperation with other computers that have been assigned other tasks. For example, arrows illustrate a plurality of communication interfaces that define relationships 102a-102h. Each of the relationships 102 can include a number of parameters that define the communication information required to interactively communicate, share data, update application states, etc. In one embodiment, each computer could have a specific IP address assigned to that particular computer in the multi-tiered application environment. The IP address can either be static or dynamically assigned using Dynamic Host Configuration Protocol (DHCP).

Other communication information can include software credentials needed to access the various computers or communication between the various computers that require either passwords, codes, or keys. For instance, some computers may implement firewalls, log-on procedures, and other security configurations designed to safeguard the information being processed by the multi-tiered application 100. Any one or more of this information can be broadly construed as relationships 102, which are part of a computer or shared between the various physical hardware machines that make up the multi-tiered application 100.

These relationships in turn, are defined by specific parameters that must be programmed into each of the computers, or devices communicating with particular computers and databases. For completeness, that multi-tiered application 100 and its various physical computers will now be described, to illustrate the physical relationships as well as the logical relationships between the computers that define the multi-tiered application 100. In this example, a load balancer is provided that communicates with front end application server (FA1), as well as the front end application server (FA2). As illustrated, the front end application servers FA1 and FA2 each communicate with a database server (FD). The front end application server FA1 in turn, communicates with the back end application server (BA2).

In a similar manner, the front end application server FA2 communicates with the back end application server (BA1). Back end application server BA1, as well as back end application server BA2, communicate with database server (DB), by way of relationships 102g and 102h. In this multi-tiered application 100, the load balancer is designed to communicate with redundant front end and back end servers, so as to enhance the operation and capacity of the system, as well as to provide fail-over.

The multi-tiered application 100 of FIG. 1 was provided to illustrate that the relationships for communication between the various physical computer systems, databases, and network equipment (not shown), require special programming and configuration at the time the systems were set up. Once the configurations of the relationships and associated parameters are set, the system is tested and operated in accordance with its settings. Additionally, the configuration illustrated in FIG. 1 is only provided to illustrate that the various physical computer systems will require specific configurations and relationships in order to exist and operate in its desired mission implementation.

Virtualization of physical hardware is a desired conversion for a multitude of reasons. Virtualization of hardware enables for simplified deployment of new virtual systems, as well as simplicity in management and utilization of hardware resources. As a result, multi-tiered applications 100 and their associated hardware are commonly being virtualized using virtualization tools. These virtualization tools will act upon a single piece of hardware at a time in order to convert and create a virtual machine from a defined physical machine. As mentioned above, virtualization of machines has become simpler as tools are provided to enable users to examine and convert the physical systems into virtual systems. The noted drawback is that physical systems are generally converted to virtual systems one at a time. Consequently, the relationships between other physical computers in a system are ignored or are not considered important when virtualization of a particular physical computer is performed. The result is that each of the physical computers are virtualized to create virtual machines that are assigned to host computer machines. The host computer machines act as a server machine, and the server machine can host one or more virtual machine that result from specific virtualizations of specific physical computers.

The resulting (one-by-one) virtualization will therefore lose the relationships 102 created when the multi-tiered application 100 was created. Thus, substantial time and effort is required to then reconfigure each of the virtual machines that are created from the various physical machines that were individually virtualized. Although the illustration of FIG. 1 provides a sampling of the various relationships that must be considered, some multi-tiered applications 100 actually consist of hundreds upon hundreds of physical computers that were converted to virtual machines. Re-establishing all the relationships within the multi-tiered application 100 would then become very cumbersome, time-consuming, and error prone. With the drawback in mind, embodiments of the present invention define methods for generating visual models that take proposed virtualization of physical machines and then generate a visual model of a resulting virtualized system. The virtualized system will also retain the relationships that were identified as well as an analysis of the virtualization infrastructure for utilization when a resulting virtual model and virtualization is performed.

In one embodiment, the process will include information gathering that entails a process for obtaining relationships, configuration parameters, credential information, and interdependencies from the physical systems that are to be virtualized. At this point, the gathering of information can be done in an automated manner by querying the physical systems for information regarding their relationships, credentials, and other information.

In one embodiment, automated requests can be made to the physical systems if the physical systems have the software capable of returning information regarding their relationships, parameters and credentials. In one embodiment, an automated technique we use a common information model (CIM) request that is processed by the physical systems and then gathered in an automated manner. Broadly, a CIM architectures includes clients and servers.

A server can respond to CIM requests from a client. This request can be used to obtain all of the information about the physical system, its relationships with other systems of a group and all associated parameters. Thus, CIM clients communicate with managed systems (e.g., CIM servers), which operate with a common information model object manager (CIMOM). A CIMOM includes a repository for storing schemas that are defined by one more classes. The CIM Schema supplies a set of classes with properties and associations that provide a framework within which it is possible to organize the available information about the managed environment. The CIM Schema is therefore a combination of the Core and Common Models. CIM management information has a specific format to enable the exchange information. The CIM Specification defines a language based on the Interface Definition Language (IDL) called Managed Object Format (MOF). The MOF syntax is a way to describe object definitions in textual form, and it establishes the syntax for writing definitions.

The CIM is a hierarchical, object oriented architecture that makes it easy to track and depict the often complex interdependencies and associations among different managed objects. Such interdependencies may include those between logical network connections and underlying physical devices, or those of an e-commerce transaction and the web and database servers on which it depends. The CIM is therefore an information model of a conceptual view of the managed environment, that attempts to unify and extend the existing instrumentation and management standards (SNMP, DMI, CMIP, etc.) using object-oriented constructs and design. The CIMOM is responsible for responding to client requests over the network, and either responding to them directly (typically for class level operations) or forwarding the request to one or more Providers.

Information gathering can also include a query sent to a system administrator to identify information that was not possible to obtain in an automated request, or information that the system administrator would like to preserve, change or modify during the information gathering operation. It is envisioned that the system administrator can be provided with a graphical user interface that identifies each of the various physical computers and the various parameters. The various parameters of the various computers are then provided to the system administrator in a GUI, table, graph, folder, file system, or other representation to enable the system administrator to easily and accurately confirm, modify, or adjust the various pieces of information gathered at the initial stage.

Once the information has been gathered, an analysis operation is performed on the gathered information. The analysis will include identification of utilization requirements for each of the physical computers that will be virtualized and then assigned to a host machine. In one embodiment, the host machine can be an ESX host machine, which is available from VMware, Inc., of Palo Alto, Calif. As each host machine is only capable of servicing a particular number of virtual machines that result from the physical machines, it is important to identify the utilization requirements of each of the physical machines before they are assigned to the various host machines (ESX servers).

In one embodiment, the utilization can be performed using a capacity planner program that identifies the capacity required for the various applications running on the resulting virtual machines. In still another embodiment, the utilization can be obtained from historical data of use or operations performed by the programs running on the physical machines. The historical data can then be used to plan and assess which virtual machines will be assigned to particular ESX servers.

Now that the information gathering and the analysis operations are performed, a modeling operation will be performed automatically by the process in accordance with one embodiment of the present invention. In one embodiment, a visual model is provided and presented to a system administrator or user in response to completing the information and analysis steps. In the model, a proposed virtualization configuration is presented which will fit the capabilities of the physical servers. For example, if the physical server has two network interface cards (NICs), the corresponding virtual machine (VM) will have two virtual NICs. Accordingly, each of the virtualized machines will be constructed so as to mirror the capabilities of the physical machines that were virtualized in order for the model to maintain the relationships that existed between the physical machines.

Figure 2:
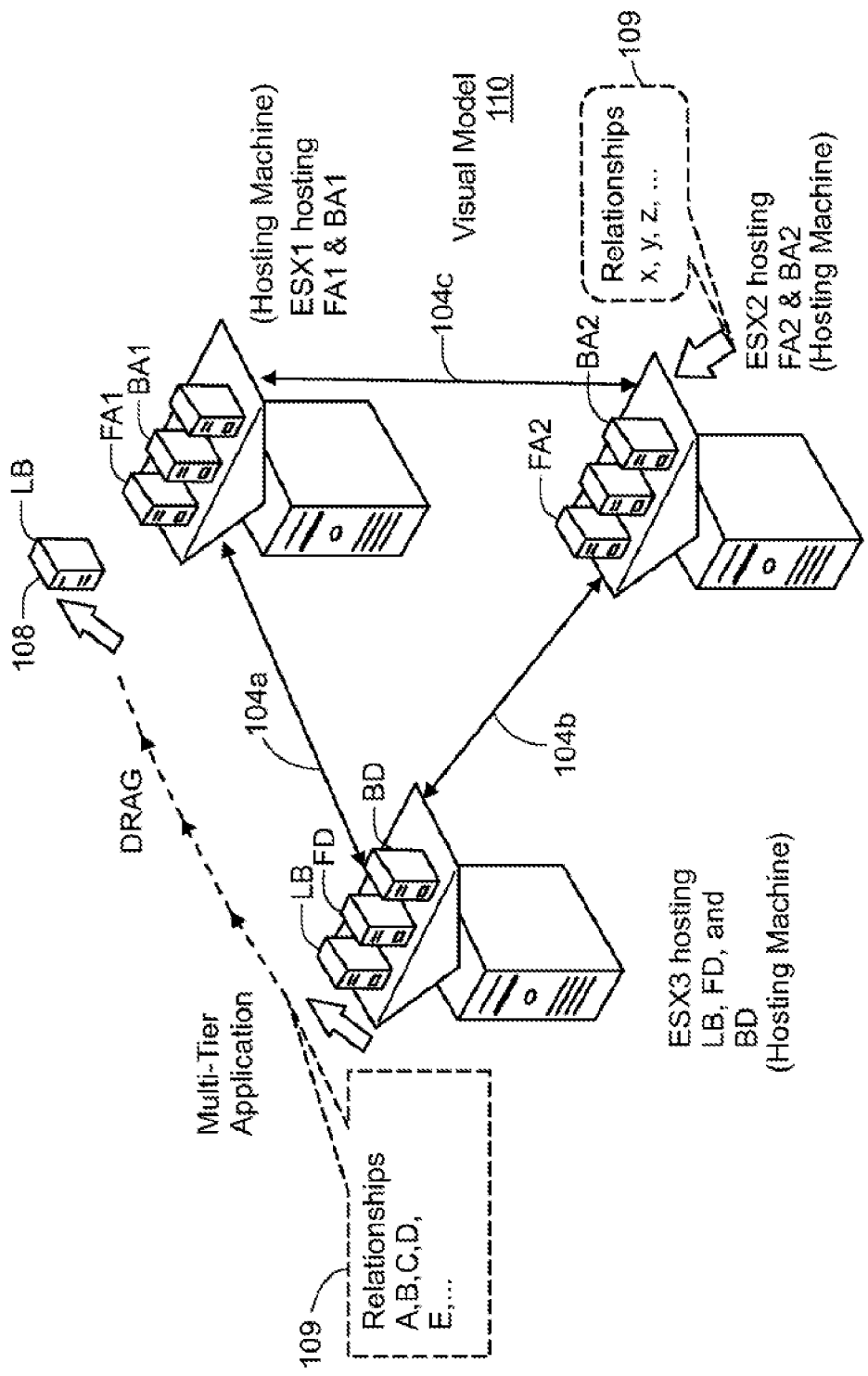
FIG. 2 illustrates an example of an interactive visual model that is created from the physical machines and their relationships, in accordance with one embodiment of the present invention.

FIG. 2 illustrates the multi-tiered application in its visual model 110, before the virtualization occurs. The visual model 110 illustrates representations of the hosting machines (ESX1, ESX2, and ESX3). These hosting machines are shown with associated virtual machines (i.e., small server box icons) that will be hosted by the hosting machines, in accordance with one embodiment of the present invention. The visual model 110 also illustrates the relationships 104a, 104b, and 104c. The relationships are those that were presented and contained within the physical systems shown in FIG. 1.

The virtual model 110 also enables the user to select different virtual machines that are assigned to the hosting machines and drag and drop them to the various hosting machines, make new hosting machines, etc., depending on the desired resulting virtualization. Although the proposed virtualization has been constructed based on the gathered information and the utilization analysis, the user or system administrator may know that a different configuration or assignment of a virtual machine to a given hosting machine is preferred over a proposed configuration. As a result, the ability to drag, drop, move and re-set the visual model 110 provides additional flexibility to the user to achieve the desired virtualization while maintaining the set relationships.

In the illustrated visual model 110, ESX1 is shown hosting FA1 and BA1. ESX2 is shown hosting FA2 and BA2. ESX3 is shown hosting LB, FD, and BD. The moving of LB 108 is shown using a drag and drop operation that allows LB to be moved from ESX3 to ESX1. If LB is moved to ESX1, the visual model 110 will also be adjusted so that the relationships are maintained, updated, and the utilization parameters are re-adjusted. If utilization parameters indicate that the drag and drop operation exceeds a threshold load for a given ESX, a warning would be given through the visual model user interface.

For example, FA1 & FA2 may have been grouped on same ESX server but the system admin may wants them on separate servers to plan for any possible ESX Server/Hardware failure. Also, proposed VM capabilities can be adjusted in the model, e.g., number of vNICs, number of CPUs, CPU capacity, memory, etc.

Additional suggestions or recommendations may also be provided to the user in response to an inappropriate or non-recommended drag and drop of the particular virtual machine from one hosting machine to another, or other change. Still further, the visual model can also allow user to add additional hosting machines if the load requirements are anticipated to increase or change, as known by the system administrator or user that is viewing the virtual model, before the virtualization occurs.

Figure 3:
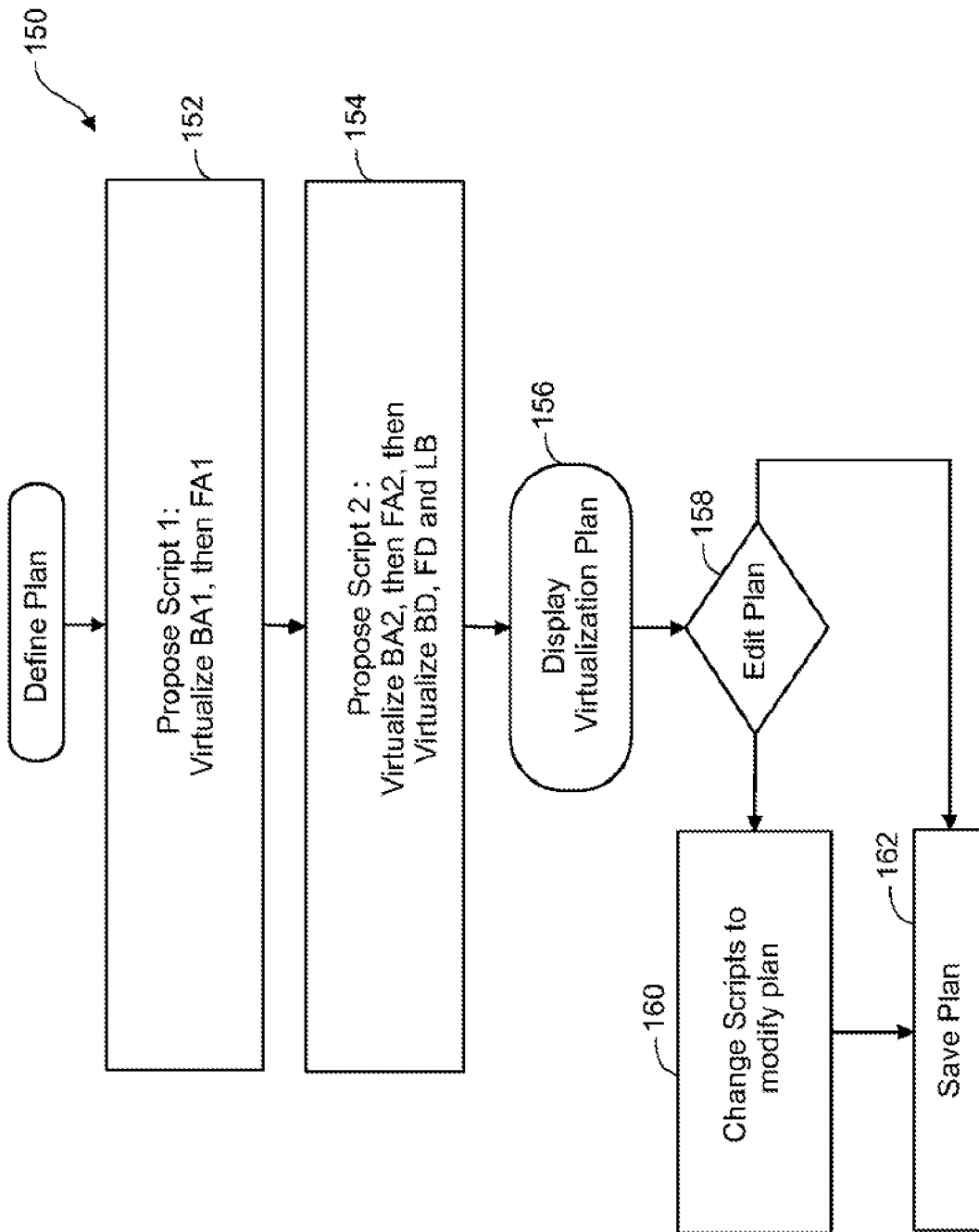
FIG. 3 illustrates a sequence of virtualization steps that are proposed, for the virtualization routine to transform the visual model into an actual virtualized system, in accordance with one embodiment of the present invention.

FIG. 3 illustrates a process that defines the execution sequence of the virtualization operations to be carried out by the system in response to the visual model 110. Process flow 150 of FIG. 3 illustrates that based on the information gathered and analysis, and any modeling adjustments or modifications made, the virtualization scheme is defined by generated proposed scripts. The scripts define a sequence of operations to be performed, and a sequence of operations to be executed to virtualize each one of the physical machines into virtual machines. As is well known, there will be cases where one for a physical machine must be converted into a virtual machine before the other. In one embodiment, in order to maintain the relationships intact, the sequence of proposed virtualization steps should be followed in order to avoid a break in the relationships or cause potential inoperability.

Based on the defined plan, operation 152 shows a proposal for script 1 that will, among other things, collect configuration information, prepare the computers for virtualization (e.g., shutdown certain critical applications, take the computers out of the load balancer, etc.) and trigger virtualization of BA1 followed by the virtualization of FA1. Referring to FIG. 1, it is shown that FA1 is the front end application server FA1, and the BA1 is the back end application server BA1. Load balancer is also shown in FIG. 1, which provides work optimization across the load balanced systems. In order to proceed with the virtualization of script one of FIG. 3, the BA1 and FA1 should be removed from the load balancer to allow operational use through FA2 and BA2 during the virtualization of FA1 and FA2 in operation 152. In this embodiment, any process critical operations and programs can continue to operate through the front end application FA2 and the back end application BA2, during the virtualization of FA1 and BA1.

The method would then move to operation 154 where a proposed script 2 would enable the virtualization of BA2 and then FA2, followed by the virtualization of BD, FD, and LB. During the virtualization of the databases, it may not be possible to continue un-interrupted operations of the multi-tiered application 100 if the databases are required or critical to the servicing of those process applications or services. If the databases are not required during the virtualization of FA2 and BA2 in operation 154, then it is possible to continue with un-interrupted operation of the multi-tiered application 100.

The defined plan 150, however, is only a proposed virtualization sequence. The proposed virtualization sequence is also displayed to the user through a graphical user interface to illustrate the operations that will be performed during the virtualization. It is possible that the user or system administrator will know of or require an additional step, script, or modification to the defined plan. If such modification is desired, the operations move from 158 to 160 where changes in the scripts are made to modify the plan. Although scripts are specifically identified, it is possible to have other process operations that are not scripts (e.g., algorithms, flows, methods, etc.), which can be modified in accordance with the user's requirements. Once the plan has been defined, the user can save the plan in operation 162. The plan is preferably save to memory, and can be recalled when the virtualization operations take place.

Figure 4:
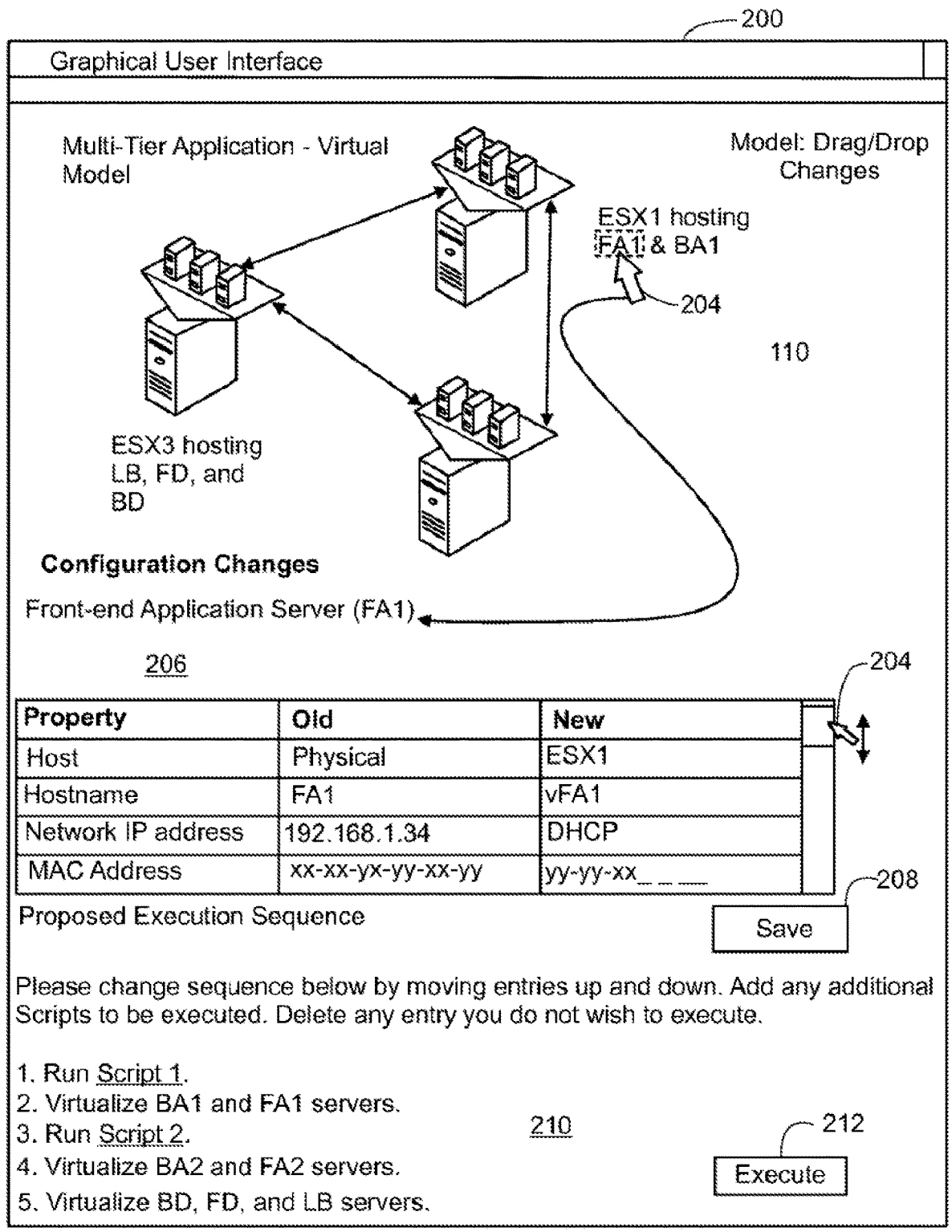
FIG. 4 illustrates a graphical user interface, providing system administrators with interactive access to the visual model and editable access to the execution sequence, in accordance with one embodiment of the present invention.

FIG. 4 illustrates a graphical user interface 200 showing an example of the visual model 110, as well as the visually detected configurations for the various properties of the physical machines that were converted into virtual machines. The multi-tiered application virtual model will therefore illustrate the various hosting machines (ESX servers, other virtualization supplier servers, etc.) that will be supporting the virtual machines that represent the virtualized physical computers.

In one embodiment, the user can use a mouse clicker or pointer 204 to click on the virtual machines in the virtual model itself. When the user clicks on FA1 using pointer 204, section 206 of the graphical user interface 200 will illustrate the properties of the selected virtual machine FA1. If other VMs are clicked, section 206 will change accordingly. In this example, FA1 is the front end application server, which has a plurality of properties. For ease of illustration, only a few sample properties are shown, but pointer 204 may be used to move a slider in the graphical user interface window that shows the additional properties of the particular virtual machine. Thus, the host in this example is ESX1, representing the hosting machine for FA1. The host name will be a virtual FA1 (vFA1). The network address will be assigned by DHCP. The original settings are also provided under the notation "old."

As mentioned above, the properties 206 of FA1 are only presented for example, and other information will also be provided, such as hardware configuration information of the original physical machine, and the resulting configuration for the new machine. Certain physical configurations may include the media access controller (MAC), that define the machine number assigned to the physical machine. The MAC number is also referred to as the MAC address, and each computer system is universally assigned a particular number that is unique. As a result, the new MAC address for the virtual machine cannot be identical to the original machine. However, the new MAC address that is assigned can be correlated to properly be referenced by other virtual machines that may be referencing that virtual machine (if the MAC address was used for identification or a relationship).

If the host name is changed for one of the virtual machines, the virtual machines that were referencing that new virtual machine will also be updated so that each of the machines can properly continue to use their original relationships, or the relationships that were defined by the visual model, in accordance with one embodiment of the present invention. Still shown in section 206 of the graphical user interface 200 is the ability of a user, such as a system administrator to assign new MAC addresses to specific virtual machines, based on the relationships that should be maintained between virtual machines, that are part of the visual model. In one embodiment, a new MAC address is automatically obtained from the virtual Network Interface Card (vNIC) of the virtual machine.

Once the relationships, parameters, and properties of the specific virtual machines have been identified and their old and new configurations are saved by selecting button 208, the information is saved to memory, storage, or a file. This information, once saved, can be used in conjunction with the visual model 110 to define the proposed execution sequence.

Section 210 of the graphical user interface shows an example interface provided to the user. As discussed above, there are two scripts that would be run in operations 152 and 154 of FIG. 3. In this example, it is shown that script 1 would be run first, and then the virtualization of BA1 and FA1 servers would occur. The next step would be to run script 2 followed by the virtualization of BA1 and FA2 servers. Then BD, FD, and LB servers would be virtualized. At this point, it is possible that the user may wish to switch the suggested proposed execution sequence. If the sequence is desired to be changed, the user can simply add additional scripts, move scripts up or down, modify scripts, or remove scripts altogether. For simplicity, only scripts 1 and 2 are shown, but it is envisioned that a multitude of scripts may be provided to enable the organized and efficient virtualization of many machines, clusters of machines, or even hundreds upon hundreds of machines, based on the created visual model. Once the user or system administrator is satisfied with the execution sequence, the user can simply proceed to select the execute button 112, in the graphical user interface, that will then commence the execution of the virtualization of the multi-tiered application example.

Once the model is finalized, virtualization will not need any manual intervention assuming that either ESX servers can be deployed automatically or physical hosts are shipped with ESXi.

Apart from various benefits of virtualization, one embodiment is to make virtualization transparent to the application users i.e., all the configuration and group semantics should be unchanged. In other embodiments, the user or system admin can change one or more configuration and/or group semantics, or can override recommendations. For one example, a process may be as follows:

1. VMware Converter is used to convert server BA1. No need to change hostname or network configuration. ESX server (ESX1) is deployed and virtual machine BA1 is powered on ESX1.
2. FA1 is converted to VM and powered on ESX1.
3. ESX2 is deployed. FA2 & BA2 are converted to VMs and powered on ESX2.
4. ESX3 is deployed. BD, FD, and LB are converted to VMs and powered on ESX3.

If no configurations changes are made, all servers will retain IP addresses (or DHCP configuration) and hostnames—hence, making virtualization transparent to the users. Then, users can still connect to same IP address or hostname, to consume services offered by the application.

In still another embodiment, partial virtualization can be performed. In case the system admin may not be comfortable with virtualizing all the servers, and can select a subset of servers during the modeling step. As shown in FIG. 2 or FIG. 4, the user may wish to virtualize less than all of the physical machines. Such option can be provided by way of a graphical control, a pull down menu, or dragging VMs off of ESXs or removing ESXs all together. It may also be possible to modify the virtualization sequence, thus removing scripts from the plan. The created VMs will then continue to operate with the remaining physical machines, as the relationships are kept in tact.

Still further, system down time can be managed. For instance, in some cases, where physical systems are deployed with redundancy & load-balancing, application downtime can be made zero or close to zero, by using proper sequence and scripts as mentioned above.

Figure 5:
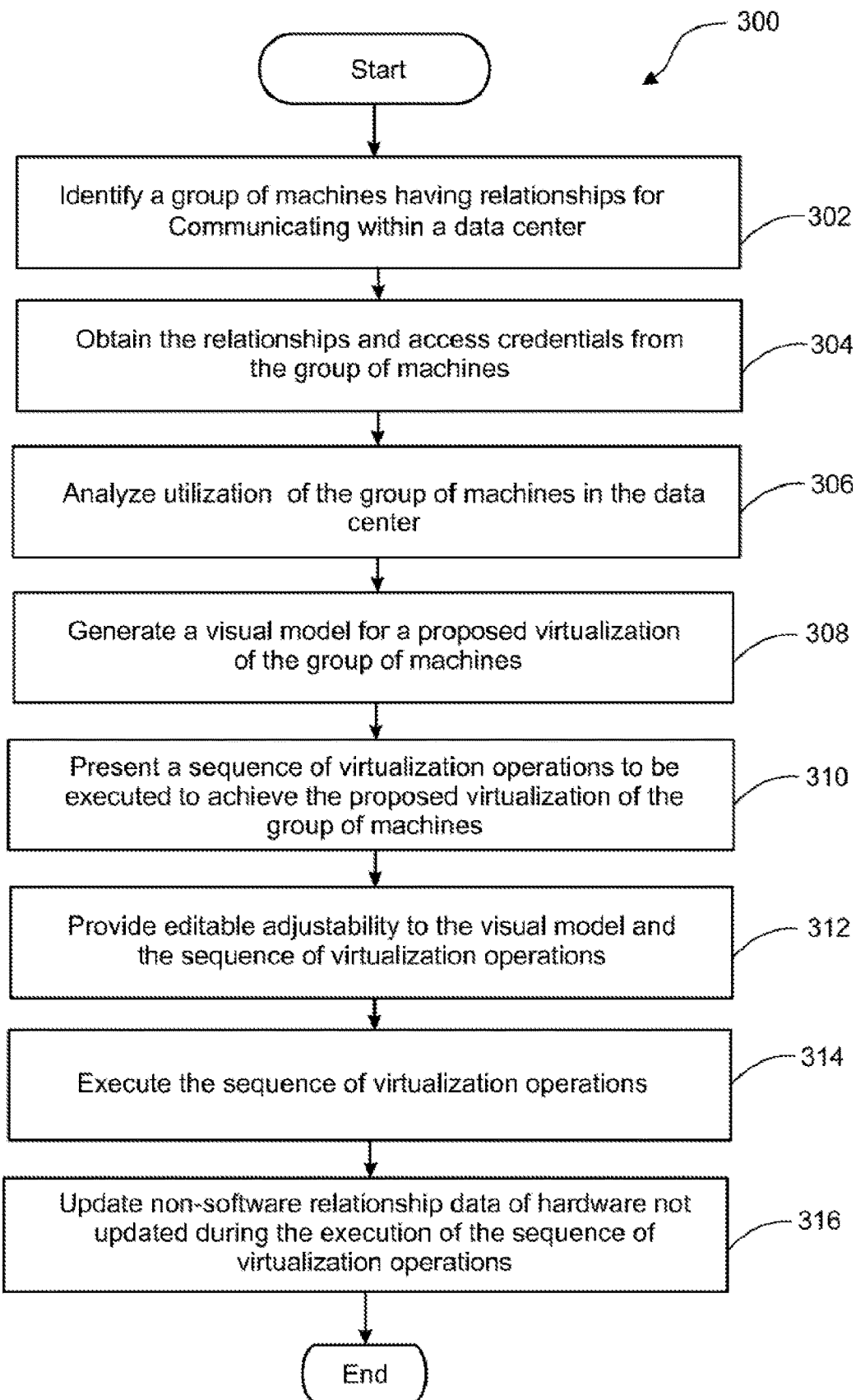
FIG. 5 illustrates a flow chart diagram of one embodiment, which allows for the automation of group virtualization, while preserving the relationships that existed in the physical machines, after virtualization is completed, in accordance with one embodiment of the present invention.

FIG. 5 illustrates a flow chart diagram 300 of method operations performed, in one embodiment of the present invention. In this embodiment, operational steps are performed in order to examine physical machines that are part of a group of machines. In one embodiment, the machines can be part of a data center. The computers are examined to identify and gather information associated with their relationships relative to other computers in the group. This identification step 302 is performed so that the appropriate number of computers that will be virtualized are identified.

In operation 304, the identified computers from the group or data center are examined to obtain the defined relationships between the computers, databases, and other computing and storage infrastructure in order to obtain and define the relationships, as well as access credentials to the various computers of the group. Once these relationships and parameters, as well as any access credentials are obtained in operation 304, the method moves to operation 306 where utilization or anticipated utilization of the group of computers and the processes performed on those computers is analyzed. If certain computers or processes are charged with high throughput or high bandwidth operations, higher utilization will be required, and ultimate virtualization to host machines needs to be based on the workload assigned hosting machine (e.g., ESX).

In operation 308, a visual model for the proposed virtualization of the group of computers is generated automatically. This visual model will generate a listing of recommended hosting machines and the virtual machines that are to be installed on the hosting machines to satisfy the virtualization of the physical machines that are part of the group of machines or data center.

In operation 310, a sequence of virtualization operations are presented to the user to achieve the execution of the proposed virtualization of the group of machines. The sequence of virtualization operations represent the steps performed and the order in which the steps are going to be performed in order to meet the virtualization, while still preserving the relationships between the various computers that are part of the virtualization group.

In one embodiment, both the sequence of virtualization operations as well as the visual model, may be presented to the user in a graphical user interface, a tabular form, or a listing that allows the user to interface with the information and make modifications if desired. Although the visual model and the sequence of virtualization operation are defined, based on the original physical machines, relationships, and utilization factors, the system administrator or user may propose alternatives, based on plan changes to the system, or known desires for a different configuration.

Thus, operation 312 provides editable adjustability to the visual model and the sequence of virtualized operations to allow modifications, if desired. Once the modifications have been made, if any, the sequence of virtualization operations are executed in operation 314. If any non-software relationship data of hardware is not updated during the virtualization operation, the method can proceed to operation 316 where the hardware configuration data can be modified to make adjustments to the resulting virtualized systems. In one or more embodiments, an audit trail is maintained for the sequence of virtualization operations for a future reporting and/or troubleshooting purpose.

In one embodiment, it is desired to keep a record of the virtualization operations that were performed, as well as the virtual visual model of the virtualized system. If any troubleshooting is desired to be performed on the resulting virtualized system, it is possible to quickly refer back to the visual model 110 and identify each of the virtual machines and the hosting machines, as well as identify their relationships.

As shown in FIG. 2, the relationships of each of the virtual machines that were virtualized can then be double-checked back to the visual model 110. By accessing the visual model that is save for future reference, the system administrator can go back to each of the virtual model virtual machines, click on the specific virtual machine and identify their relationships 109 to the various other machines that were virtualized as part of the virtualization. Accordingly, it is possible to save a log of the virtualization process, as well as the virtualization model for future reference and troubleshooting in case there is a conflict, error, or adjustment required during the operation of the virtual implementation of the model.

Although virtualization operations can take on many forms, several concepts are important to ensure that physical constructs of physical machines are properly transferred to virtual machines. With this in mind, and by way of reference, more information on virtual system and methods can be found in U.S. patents owned by the assignee of the present application, VMware, Inc. Thus, U.S. Pat. Nos. 6,397,242, 6,496,847, 7,069,413, 7,356,679, and US Published Application 2008/0244028 A1, are each incorporated by reference for all purposes.

For completeness, reference is made to an example server system, that is referred to by the trademark "ESX™", which is provided by VMware, of Palo Alto, Calif. However, the methods, systems and embodiments are not limited to any one brand of server or virtualization servers. The example ESX(x) server is a hypervisor that partitions physical servers in multiple virtual machines. Each virtual machine may represent a complete system, with processors, memory, networking, storage and BIOS. VMware ESX enables multiple virtual machines to: (a) share physical resources, (b) run unmodified operating systems and applications, and (c) run the most resource-intensive applications side by side on the same server. Other servers made by other suppliers can have similar functionality or more or less functionality, depending on their target product. Accordingly, the systems, methods and computer readable media can be practiced using any product, software, or hardware configuration.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C #, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A method comprising:
   receiving a request to convert a plurality of computers into virtual computers;
   generating a visual model for a proposed virtualization of the plurality of computers;
   presenting a sequence of virtualization operations to achieve execution of the proposed virtualization;
   providing an editable adjustability to at least one of the visual model and the sequence of virtualization operations; and
   receiving user input based on the provided editable adjustability; and based on the user input, converting the plurality of computers into the virtual computers.

2. The method of claim 1, wherein presenting the sequence of virtualization operations comprises presenting a script that defines an execution sequence of the virtualization operations.

3. The method of claim 2, wherein the script includes a defined order in which the execution sequence of virtualization operations is to be executed such that relationships defined by relationship data that identifies parameters that define relationships between the plurality of computers are maintained.

4. The method of claim 1, further comprising:
presenting additional virtualization operations to be executed;
receiving an additional modification of the execution sequence of virtualization operations based on the additional virtualization operations; and
converting the plurality of computers into the virtual computers at a point in time by executing the additional modified execution sequence of virtualization operations.

5. The method of claim 4, wherein the additional virtualization operations includes a request to enable zero interruption in mission processing by the plurality of computers during execution of the execution sequence of virtualization operations.

6. The method of claim 1, further comprising:
comparing relationship data for the plurality of computers with relationship data for the virtual computers, the relationship data identifying parameters that define relationships between the plurality of computers or the virtual computers; and
adjusting parameters of the virtual computers based on the comparing.

7. The method of claim 1, further comprising:
presenting a second script that defines a second execution sequence of virtualization operations to be executed in order to convert a second plurality of computers into a second set of virtual computers, the execution sequence being based on: a) relationship data for the second plurality of computers, the relationship data identifying parameters that define communication information needed to communicate between the plurality of computers and the second plurality of computers, and b) each hosting machine designated to define the second set of virtual computers for each of the second plurality of computers; and
converting the second plurality of computers into the second set of virtual computers by executing the second execution sequence of virtualization operations.

8. A system comprising:
a memory; and
a processor programmed to:
receive a request to convert a plurality of computers into virtual computers;
generate a visual model for a proposed virtualization of the plurality of computers;
present a sequence of virtualization operations to achieve execution of the proposed virtualization;
provide an editable adjustability to at least one of the visual model and the sequence of virtualization operations; and
receive user input based on the provided editable adjustability; and
based on the user input, convert the plurality of computers into the virtual computers.

9. The system of claim 8, wherein presenting virtualization operations comprises presenting a script that defines an execution sequence of the virtualization operations.

10. The system of claim 9, wherein the script includes a defined order in which the execution sequence of virtualization operations is to be executed such that relationships defined by the relationship data are maintained.

11. The system of claim 8, wherein the processor is further programmed to:
present additional virtualization operations to be executed;
receive an additional modification of the execution sequence of virtualization operations based on the additional virtualization operations; and
convert the plurality of computers into the virtual computers at a point in time by executing the additional modified execution sequence of virtualization operations.

12. The system of claim 11, wherein the additional virtualization operations includes a request to enable zero interruption in mission processing by the plurality of computers during execution of the execution sequence of virtualization operations.

13. The system of claim 8, wherein the processor is further programmed to:
compare relationship data for the plurality of computers with relationship data for the virtual computers, the relationship data identifying parameters that define relationships between the plurality of computers or the virtual computers; and
adjust parameters of the virtual computers based on the comparing.

14. The system of claim 8, further comprising a second plurality of computers, wherein the processor is further programmed to:
present a second script that defines a second execution sequence of virtualization operations to be executed in order to convert a second plurality of computers into a second set of virtual computers, the execution sequence being based on: a) relationship data for the second plurality of computers, the relationship data identifying parameters that define communication information needed to communicate between the plurality of computers and the second plurality of computers, and b) each hosting machine designated to define the second set of virtual computers for each of the second plurality of computers; and
convert the second plurality of computers into the second set of virtual computers by executing the second execution sequence of virtualization operations.

15. A non-transitory computer readable medium comprising computer-executable instructions that, when executed by a processor, cause the processor to:
receive a request to convert a plurality of computers into virtual computers;
generate a visual model for a proposed virtualization of the plurality of computers;
present a sequence of virtualization operations to achieve execution of the proposed virtualization;
provide an editable adjustability to at least one of the visual model and the sequence of virtualization operations; and
receive user input based on the provided editable adjustability; and
based on the user input, convert the plurality of computers into the virtual computers.

16. The non-transitory computer-readable medium of claim 15, wherein presenting virtualization operations comprises presenting a script that defines an execution sequence of the virtualization operations.

17. The non-transitory computer-readable medium of claim 16, wherein the script includes a defined order in which the execution sequence of virtualization operations is to be executed such that relationships defined by relationship data that identifies parameters that define relationships between the plurality of computers are maintained.

18. The non-transitory computer-readable medium of claim 15, wherein the computer-executable instructions further cause the processor to:
present additional virtualization operations to be executed;
receive an additional modification of the execution sequence of virtualization operations based on the additional virtualization operations; and
convert the plurality of computers into the virtual computers at a point in time by executing the additional modified execution sequence of virtualization operations.

19. The non-transitory computer-readable medium claim 18, wherein the additional virtualization operations includes a request to enable zero interruption in mission processing by the plurality of computers during execution of the execution sequence of virtualization operations.

20. The non-transitory computer-readable medium of claim 15, wherein the computer-executable instructions further cause the processor to:
compare relationship data for the plurality of computers with relationship data for the virtual computers, the relationship data identifying parameters that define relationships between the plurality of computers or the virtual computers; and
adjust parameters of the virtual computers based on the comparing.

* * * * *